(12) United States Patent
Desbois-Renaudin et al.

(10) Patent No.: US 9,705,356 B2
(45) Date of Patent: Jul. 11, 2017

(54) ELECTRICAL POWER SUPPLY SYSTEM WITH ALTERABLE CAPACITY

(71) Applicant: Commissariat a l'energie atomique et aux energies alternatives, Paris (FR)

(72) Inventors: Matthieu Desbois-Renaudin, Villard de Lans (FR); Laurent Garnier, Marennes (FR); Christophe Lefebvre, Coublevie (FR); Michael Palmieri, Grenoble (FR); Remy Thomas, Grenoble (FR)

(73) Assignee: Commissariat a l'energie atomique et aux énergies alternatives, Paris (FR)

( * ) Notice: Subject to any disclaimer, the term of this patent is extended or adjusted under 35 U.S.C. 154(b) by 937 days.

(21) Appl. No.: 14/057,148

(22) Filed: Oct. 18, 2013

(65) Prior Publication Data

US 2014/0111013 A1    Apr. 24, 2014

(30) Foreign Application Priority Data

Oct. 18, 2012 (FR) ...................... 12 59956

(51) Int. Cl.
*H02J 7/34* (2006.01)
*B60L 11/18* (2006.01)
(Continued)

(52) U.S. Cl.
CPC ............ *H02J 7/34* (2013.01); *B60L 11/1866* (2013.01); *H02J 7/0016* (2013.01); *H02J 7/0063* (2013.01); *B60L 2240/545* (2013.01); *B60L 2240/547* (2013.01); *B60L 2240/549* (2013.01); *H01M 10/052* (2013.01); *H01M 10/441* (2013.01); *H02J 7/0029* (2013.01);
(Continued)

(58) Field of Classification Search
CPC ..... H01M 10/44; H01M 10/48; H01M 10/425
See application file for complete search history.

(56) References Cited

U.S. PATENT DOCUMENTS

2010/0072950 A1* 3/2010 Tatebayashi .......... H02J 7/0031
                                                          320/134
2012/0256592 A1    10/2012 Baughman

FOREIGN PATENT DOCUMENTS

DE    102008060936    6/2010
DE    102010020294    8/2011
(Continued)

*Primary Examiner* — Sibin Chen
(74) *Attorney, Agent, or Firm* — Occhiuti & Rothlicek LLP

(57) ABSTRACT

An electrical power supply system has electrical energy storage modules and an interconnection interface. Each module includes connection terminals of opposite polarities and an energy storage element connected between them. The interface includes pairs of input terminals and output terminals for a load's power supply. Each pair of input terminals connects removably to connection terminals of a respective storage module. The interface forms parallel branches between the two output terminals. Each includes a storage element. Each branch includes a rheostat in series with a corresponding storage element of the branch. The interface includes a device for measuring current passing through each of the branches, and a control circuit for controlling resistances of the rheostats of the branches as a function of the measured current so as to maintain a current intensity passing through the rheostats to be below a threshold.

13 Claims, 5 Drawing Sheets

(51) Int. Cl.
*H02J 7/00* (2006.01)
*H01M 10/44* (2006.01)
*H01M 10/052* (2010.01)

(52) U.S. Cl.
CPC . *H02J 2007/004* (2013.01); *H02J 2007/0037* (2013.01); *H02J 2007/0067* (2013.01); *Y02E 60/122* (2013.01); *Y02T 10/7005* (2013.01); *Y02T 10/7055* (2013.01); *Y02T 10/7061* (2013.01); *Y10T 307/549* (2015.04)

(56) References Cited

FOREIGN PATENT DOCUMENTS

| | | |
|---|---|---|
| JP | 2001-086662 | 3/2001 |
| JP | 2008-118790 | 5/2008 |
| JP | 2009-81958 | 4/2009 |
| JP | 2012-182939 | 9/2012 |
| WO | WO2012/053426 | 4/2012 |

\* cited by examiner

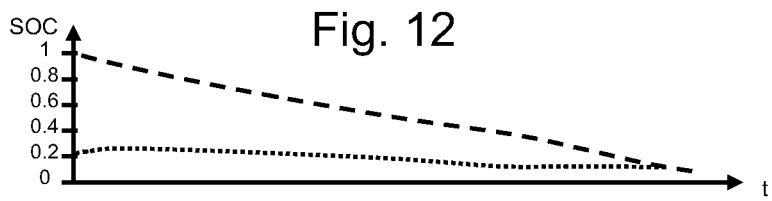
Fig. 12
Fig. 13
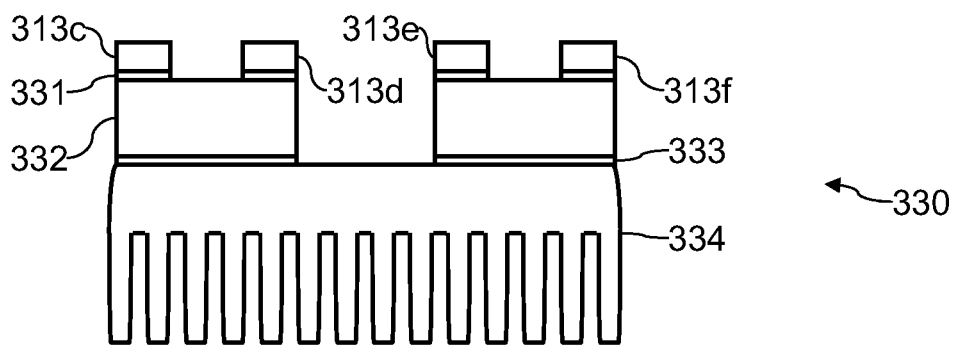
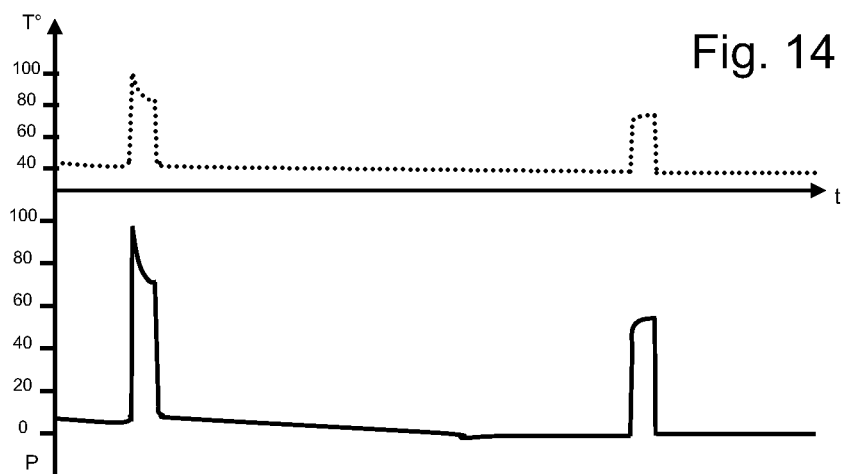
Fig. 14
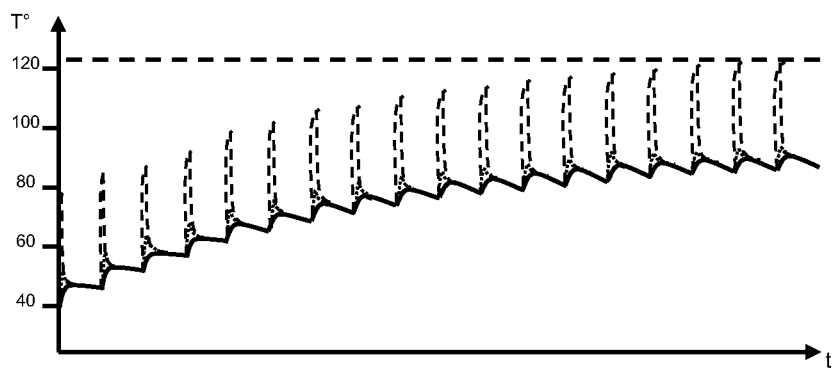
Fig. 15

ELECTRICAL POWER SUPPLY SYSTEM WITH ALTERABLE CAPACITY

CROSS-REFERENCE TO RELATED APPLICATIONS

Under 35 USC 119, this application claims the benefit of the priority date of French Patent Application 1259956, filed Oct. 18, 2012, the content of which is herein incorporated by reference.

FIELD OF DISCLOSURE

The invention relates to the powering of electrical circuits by electrical energy storage elements, and in particular the powering of nomadic electrical appliances such as electric-motor type vehicles, by way of batteries of electrochemical cells.

BACKGROUND

The multitude of distributed nomadic electrical appliances presents specific needs in respect of its energy storage, bringing about distinct supply voltages and energy storage capacities for most of these appliances. The manufacturing cost of electrochemical cells of batteries being relatively high, the approach generally chosen by battery manufacturers is to design a battery exhibiting a specific dimensioning for the electrical appliance to be powered. Thus, the scale effect is relatively limited in most cases, thus constituting an impediment to a drop in the manufacturing cost of batteries and to their spread. The limitation of the scale effect is particularly noticeable for power batteries.

Furthermore, batteries are dimensioned to take into account the most extreme cases of operation and are thus usually overdimensioned for daily use by users. The range of a vehicle with electric motorization is for example defined by the capacity of its battery, this capacity being dimensioned by an appropriate number of electrochemical cells connected electrically in series and in parallel. For example, a battery can be dimensioned for a range of 80 km for a bike with electrical assistance, whereas in practice the user undertakes its recharging every 15 km on account of its daily use. Consequently, the user purchases an overdimensioned battery which is therefore more expensive in relation to its actual use.

There therefore exists a need for a solution making it possible to standardize the electrochemical cells of various batteries, so as to be able on the one hand to benefit from a scale effect for various applications, and to be able on the other hand to adapt the number of electrochemical cells to the user's actual needs. These results must be obtained while preserving a system requiring a minimum of precautions of usage and immediate availability of the electric load powered by such a supply.

Moreover, it may be noted that the document JP2001-086662 describes an electrical power supply system with an interconnection interface for selectively connecting several electrical energy storage modules in parallel. A control circuit determines the number of modules connected to the interface. The power supply of a load is managed as a function of the determined number of modules.

Furthermore, it may be noted that the document JP2008-118790 describes an electrical power supply system comprising several branches connected in parallel. A drive circuit controls the current drawn towards the load by each of the branches so as to balance the states of charge of the various branches.

SUMMARY

In one aspect, the invention features an apparatus including an electrical power supply system having alterable capacity, the electrical power supply system including electrical energy storage modules, and an interconnection interface. Each of the electrical energy storage modules includes two connection terminals of opposite polarities and an electrical energy storage element connected between the two terminals. The interconnection interface includes two pairs of input terminals and two output terminals for a power supply of an electrical load. Each pair of input terminals is connected in a removable manner to connection terminals of a respective electrical energy storage module. The interconnection interface forms branches connected in parallel between the two output terminals, each branch including one of the electrical energy storage elements. Each of the branches includes a rheostat connected in series with a corresponding electrical energy storage element of the branch. The interconnection interface further includes a device for measuring current passing through each of the branches, and a control circuit configured for controlling resistances of the rheostats of the branches as a function of the measured current so as to maintain a current intensity passing through the rheostats to be below a protection threshold.

In some embodiments, the electrical energy storage elements comprise electrochemical accumulators. Among these are embodiments in which the electrochemical accumulators are of LiFePO4 type.

In other embodiments, each of the rheostats is included in the interconnection interface and is connected between a respective input terminal and an output terminal.

Also included are embodiments in which each of the rheostats includes a MOS transistor whose resistance is defined by application of a gate/source voltage by the control circuit. Among these are embodiments in which each of the rheostats includes two MOS transistors connected head-to-tail in series, and wherein a resistance of each of the two transistors is defined by the application of the gate/source voltage by the control circuit.

Other embodiments also include a thermal dissipater, and two thermal absorption elements coupled thermally to the thermal dissipater, wherein each thermal absorption element is thermally coupled to a corresponding rheostat. In some of these embodiments, the thermal absorption elements are thermally coupled to the thermal dissipater by way of a thermally conducting and electrically insulating layer.

In some embodiments, the control circuit is configured to maintain the current intensity passing through a rheostat to be below a first protection threshold when the rheostat is traversed by a discharge current of the associated electrical energy storage module, and wherein the control circuit is configured to maintain a current intensity passing through the rheostat to be below a second protection threshold when the rheostat is traversed by a charge current, the first and second protection thresholds being different.

In other embodiments, the control circuit is configured to allow discharge of an electrical energy storage module having a higher state of charge towards an electrical energy storage module having a lower state of charge in the absence of an electric load connected to the output terminals of the interconnection interface.

In yet other embodiments, each of the branches includes a fuse connected in series with one of the electrical energy storage elements and a rheostat, a cut-out threshold of the fuse being greater than the protection threshold.

Among other embodiments are those that further including a protection casing in which the input terminals of the interconnection interface are housed, wherein the protection casing is configured to guide the electrical energy storage modules by sliding so that connection terminals of an electrical energy storage module at an extremity of sliding travel thereof connect to a respective pair of input terminals of the interconnection interface.

In yet other embodiments, the electrical energy storage modules comprise a casing in which the electrical energy storage element is housed in a removable manner, wherein the electrical energy storage element includes electrochemical cells, and a management device for the electrochemical cells, wherein the casing includes a supervision device, and a connection facility electrically connecting the electrical energy storage element to the two connection terminals of opposite polarities of the electrical energy storage module, wherein the management device is programmed to implement a function selected from the group consisting of measurement of voltage of the electrochemical cells, measurement of temperature of the electrochemical cells, making the cells safe in case of excessive charge or discharge current, making the cells safe in case of too high or too low voltage of an electrochemical cell, and balancing voltages of the electrochemical cells, wherein the supervision device is programmed to implement a functionality selected from the group consisting of measurement of current passing through the storage element, calculation of the remaining energy in the storage element, calculation of charge/discharge power of the storage element, and recording of the electrical energy storage module's usage data.

BRIEF DESCRIPTION OF THE FIGURES

Other characteristics and advantages of the invention will emerge clearly from the description given thereof hereinafter, by way of wholly nonlimiting indication, with reference to the appended drawings, in which:

FIG. 12 illustrates the evolution of the states of charge of the modules during a discharge by repeating the usage cycles of FIG. 8;

FIG. 13 is a schematic sectional view of an example of a cooling system for transistors of an interconnection interface;

FIG. 14 illustrates the junction temperature and the power of the most-worked transistor during the operation illustrated in FIG. 11;

FIG. 15 illustrates various temperatures for the most-worked transistor during a repetition of usage cycles;

DETAILED DESCRIPTION

Figure 1:
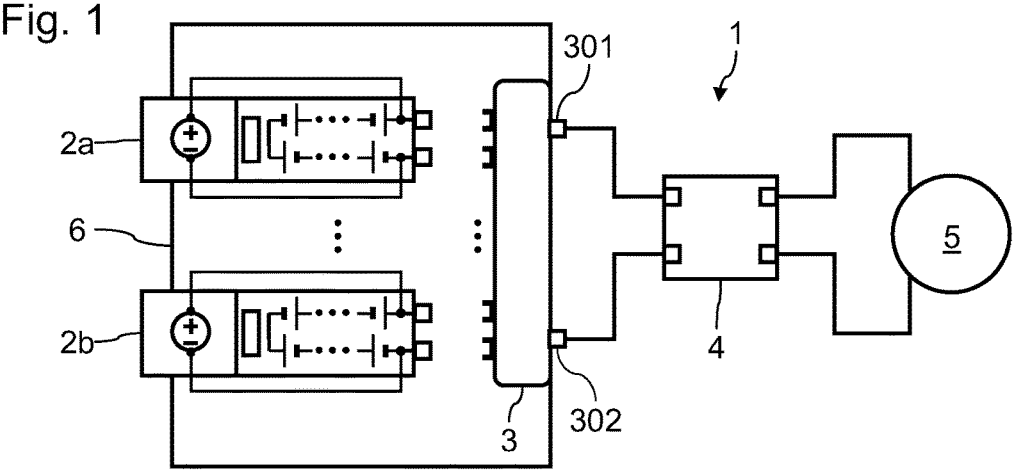
FIG. 1 is a schematic representation of a system implementing a supply device according to the invention.

FIG. 1 is a schematic representation of a system 1 implementing a supply device according to the invention. The system 1 comprises an electric load 5 to be supplied, for example an electric motor of a vehicle. The system 1 furthermore comprises a supply device with DC voltage source and an inverter 4. The supply device with DC voltage source applies its output voltage to two first terminals of the inverter 4. Two second terminals of the inverter 4 (for a single-phase AC power supply) are connected to the load 5.

The supply device is typically a power supply device, that can deliver a current intensity greater than 15 A while applying a voltage at least equal to 20 V. The supply device with DC voltage source here comprises an interconnection interface 3 built into a casing 6. The supply device with DC voltage source furthermore comprises several modules forming DC voltage sources. The supply device comprises in this instance two modules 2a and 2b mounted inside the casing 6 and intended to be connected to the interconnection interface 3. The modules 2a and 2b comprise one and the same nominal voltage. As will be detailed subsequently, the interconnection interface 3 makes it possible to connect the modules 2a and 2b in parallel without particular precautions even with different states of charge, while safeguarding despite everything these modules from aging or from explosive destruction brought about by an overly large charge or discharge current. The capacity of the electrical energy storage system can therefore be adapted in an alterable manner by the end user and without discontinuity of supply to the vehicle.

Figure 2:
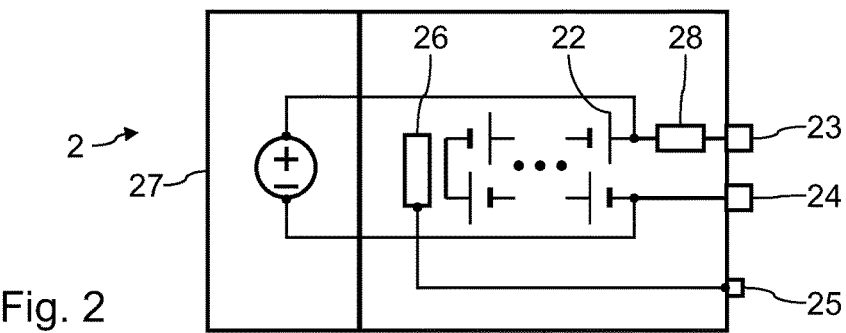
FIG. 2 is a schematic representation of a battery module that can be connected to an interconnection interface.

FIG. 2 illustrates an example of a module structure 2 that can be used in a supply device according to the invention. In a manner known per se, the module 2 comprises a casing 21 in which electrochemical cells 22 are housed. The electrochemical cells 22 are here connected in series between terminals 23 and 24 of the module 2. A device for protection against current surges 28 is connected in series with the electrochemical cells 22 between the terminals 23 and 24. The potential difference between the terminals 23 and 24 is typically at least equal to 20 V, and generally greater than 30 V in vehicle traction applications. The protection device 28 can be in a manner known per se a fuse rated so as to protect the electrochemical cells 22 against current surges. The module 2 furthermore comprises a device 26 for managing the electrochemical cells. This management device 26 is for example configured to measure a certain number of operating parameters of the module 2, for example its internal temperature, the state of charge of the electrochemical cells or else the voltage across the terminals of the electrochemical cells. The management device 26 can also be configured to communicate a certain amount of information, such as the cut-out intensity of the protection device 28 or various operating parameters, to an outside circuit by way of a communication terminal 25. The module 2 furthermore advantageously comprises a recharging circuit 27 that can be connected to a public electricity grid so as to undertake the recharging of the electrochemical cells 22. The recharging circuit 27 can also be an element separate from the module 2, connectable to the module 2 by way of a power connection.

Figure 3:
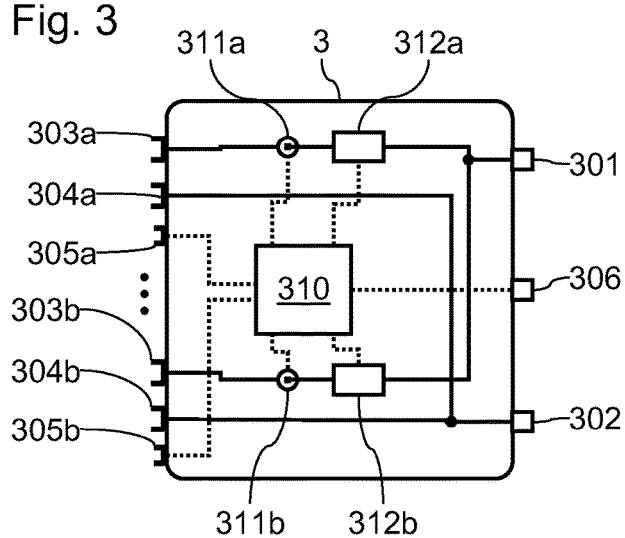
FIG. 3 is a schematic representation of a drive module of an interconnection interface.

FIG. 3 illustrates an example of an interconnection interface 3 that can be used in a supply device according to the invention. The interconnection interface 3 comprises pairs of input terminals for the connection of various modules 2, that it is desired to connect in parallel. Each pair of terminals comprises a terminal 303 and a terminal 304 intended respectively to be connected to the terminals 23 and 24 of a module 2. In this instance, the terminals 303*a* and 304*a* are connected to the module 2*a*, the terminals 303*b* and 304*b* being connected to the module 2*b*.

The interconnection interface 3 comprises a pair of output terminals 301 and 302 between which the potential difference of the supply device is applied. The terminals 301 and 302 are thus connected to the first inputs of the inverter 4.

The interconnection interface 3 is configured to selectively connect the terminals 303 to the terminal 301 and the terminals 304 to the terminal 302. The modules 2 are thus connected at the user's choice in parallel between the terminals 301 and 302. The electrical connection between the terminal 301 and each terminal 303 comprises a rheostat 312 in series, the intensity of current passing through a rheostat 312 being measured by a current probe 311. In this instance, a rheostat 312*a* is connected between the terminal 301 and the terminal 303*a*, a current probe 311*a* measuring the current through the rheostat 312*a*, a rheostat 312*b* is connected between the terminal 301 and the terminal 303*b*, a current probe 311*b* measuring the current through the rheostat 312*b*. For each module 2 connected, the supply device thus forms a parallel branch between the terminals 301 and 302 in which the module 2 and a rheostat 312 are connected in series.

A control circuit 310 recovers the current measurements provided by the probes 311 and drives the resistance value of the rheostats 312. The control circuit 310 is connected to the communication terminals 305, so as to be able to communicate with the management devices 26 of the modules 2. The terminals 304 are here directly connected to the terminal 302. The interconnection interface 3 comprises a communication terminal 306. This communication terminal 306 allows the control circuit 310 to communicate with a controller of the load 5, for example a controller of the inverter 4 managing the power drawn by the load 5.

The casing 6 can be used to protect the interconnection interface 3 and the modules with respect to outside attack. The casing 6 can also be used to allow the guidance of the modules until their terminals 23, 24 and 25 interconnect with the terminals 303, 304 and 305 respectively of the interconnection interface 3.

Figure 4:
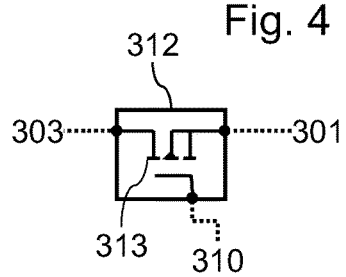
FIG. 4 illustrates an example of a rheostat that can be used within the framework of the invention.
Figure 5:
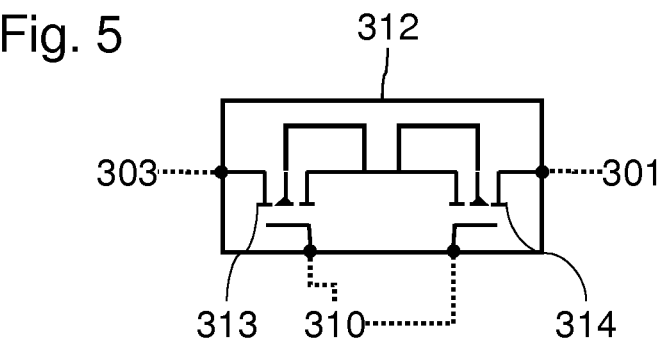
FIG. 5 illustrates another example of a rheostat that can be used within the framework of the invention.

As a function of the measurements of current performed by the probes 311, the control circuit 310 maintains the intensity of current passing through each branch below a protection threshold. Accordingly, the control circuit drives the resistance exhibited by the rheostat 312 of the branch concerned. The control circuit 310 can for example implement a regulating loop so that the current passing through the branch concerned is slaved to a setpoint current, which is below the protection threshold. The control circuit 310 can implement a protection threshold for the discharging of a module 2. With rheostats such as illustrated in FIG. 4, the limitation of a charge current is ensured by limitation of the discharge currents passing through one or more other rheostats. With rheostats 312 such as illustrated in FIG. 5, one and the same rheostat can be controlled by the circuit 310 to implement a protection threshold for the discharge of a module 2 and a protection threshold for the recharging of this module 2 of different values. Indeed, electrochemical accumulators usually exhibit a maximum permissible discharge current that is much greater than the maximum permissible recharge current.

The control circuit 310 can implement the following operation, in which a module 2 exhibiting a high state of charge can undertake the recharging of another module 2 exhibiting a low state of charge. This charge balancing can be performed either during the use of the supply device, or during rest phases. A balancing of the charges of the modules 2 at rest is particularly advantageous, since it makes it possible to profit from the rest periods in order to undertake the balancing, and thus limit the heating of the rheostats 312 which is greater during the use of the supply device.

A rheostat 312 is maintained at its minimum resistance value:
  if the measured discharge current for the associated module 2 is less than the discharge protection threshold for this module; and
  if the measured charge currents for the other modules 2 are less than the charge protection thresholds of these other modules.

A rheostat 312 is driven so as to exhibit an increased resistance value, for example by means of current regulation:
  if the measured discharge current for the associated module 2 attains the discharge protection threshold of this module; or
  if a charge current of one of the other modules 2 attains the charge protection threshold of this other module.

The control circuit 310 can issue a request to limit power to the controller of the load 5 with a view to optionally limiting the temperature of one of the rheostats 312. The control circuit 310 can advantageously drive the opening of a branch in parallel if it notes that the limitation of current in this branch is ineffective, that the temperature of the rheostat 312 of this branch exceeds a critical threshold, or when a request to decrease power issued to the controller of the load 5 is ineffectual.

On account of its current-limiting functions, the proposed supply device makes it possible to connect without particular precautions and in a reduced time modules 2 exhibiting very distinct states of charge, and modules exhibiting structures or very different designs. Prior charge balance is in particular not necessary before undertaking the use of the modules. The aging of the modules 2 is thus limited by avoiding an overly large charge or discharge current during connection with overly high disparities of charge. Even if the inrush of current through the load 5 is high, the control circuit 310 makes it possible to guarantee that the modules 2 are traversed by currents that are below the protection thresholds. This aspect is particularly advantageous with batteries of lithium ion type, exhibiting a lower internal impedance than that of a lead battery. Such a supply device furthermore allows a user to acquire a desired number of modules 2, the capacity of the supply device thus being able to be adapted by adding modules. Thus, the modules will be able to be standardized for a large variety of supply devices exhibiting different capacities, thereby making it possible to greatly reduce the cost price of such modules through economies of scale. As a function of the desired use, the user will furthermore be able to choose to connect a reduced number of modules 2, for example so as to lighten the weight of the supply device.

Upon connection of a storage module 2, the control circuit 310 can carry out a limitation of the intensity of current passing through this module to a low protection threshold, by default. Thereafter, the control circuit 310 can communicate with the module 2 by way of a terminal 305. The control circuit 310 can in particular recover a maximum value of discharge intensity or of recharge intensity provided by the management device 26 of the module 2. Once these charge or discharge values are known, the control circuit 310 can adapt the charge protection threshold and the discharge protection threshold of the associated rheostat 312, to an appropriate value. It is thus possible to use the module 2 over the whole of its power range. Be that as it may, the control circuit 310 uses a protection threshold of a lower value than the cut-out threshold of the fuse 28. Therefore, the rheostat 312 ensures protection of its module 2 before the opening of the associated fuse 28.

Moreover, the control circuit 310 can also communicate with the management device 26 of a module 2 so as to determine which modules 2 must be recharged by priority during charge balancing. Likewise, the control circuit 310 can favour the discharging of certain modules 2, for example during a discharge at low temperature, if their management device 26 indicates that they are particularly efficient at low temperature.

Advantageously, the control circuit 310 can recover or calculate a temperature value for the transistors 313. The control circuit 310 can request the controller of the electric load 5 to reduce the power drawn so as to allow cooling of the transistor 313 if an excessive temperature is measured. In case of overheating of a transistor 313, the control circuit 310 can drive the opening of this transistor so as to momentarily interrupt power dissipation.

The control circuit 310 can also communicate with the controller of the electric load 5, so as to provide information such as the discharge capacity of the system including the interconnection interface 3 and the modules 2, the energy remaining, the acceptable maximum power under charge and under discharge, the identification of possible defects, etc.

FIG. 4 is a schematic representation of a first variant of rheostat 312 that can be implemented according to the invention, here ensuring protection against discharge currents. The rheostat 312 here includes a MOS transistor 313. The drain/source junction is here connected in series between an input terminal 303 and an output terminal 301. The drain/source resistance value of the transistor 313 is defined by the amplitude of the potential difference Vgs applied by the control circuit 310. To undertake the regulation of the current passing through the transistor 313, the control circuit 310 drives the latter in the linear regime to increase its resistance when the current approaches the protection threshold. The control circuit 310 can apply a protection threshold for the discharge current. To protect the corresponding module against the charge current, the control circuit 310 limits the discharge currents of the other modules.

FIG. 5 is a schematic representation of a second variant of rheostat 312 that can be implemented according to the invention, able to ensure protection against charge currents and against discharge currents. The rheostat 312 here comprises two MOS transistors 313 and 314 mounted head-to-tail in series between an input terminal 303 and an output terminal 301. The drain/source resistance value of each transistor 313 or 314 is defined by the amplitude of the potential difference Vgs applied by the control circuit 310. Such a rheostat 312 advantageously makes it possible to independently control the discharge protection threshold through the transistor 313, and the charge protection threshold through the transistor 314. According to this variant, the control circuit 310 no longer has to coordinate the respective chargings and dischargings of the modules 2. Indeed, the charge current of a module 2 is limited automatically, without having to intervene on the regulation of the discharge current of another module 2 having a higher state of charge. Independent control circuits can then be associated with each of the modules 2. Analogue drives can then be used for the rheostats 312, at a reduced cost and with considerable robustness. Moreover, the use of such a rheostat optionally makes it possible to dispense with an independent current control inside the module 2.

As detailed subsequently, the use of the structures of FIGS. 4 and 5 makes it possible to combine the functions of rheostat 312 and of safety isolator, through appropriate drive of the control circuit 310.

Figure 6:
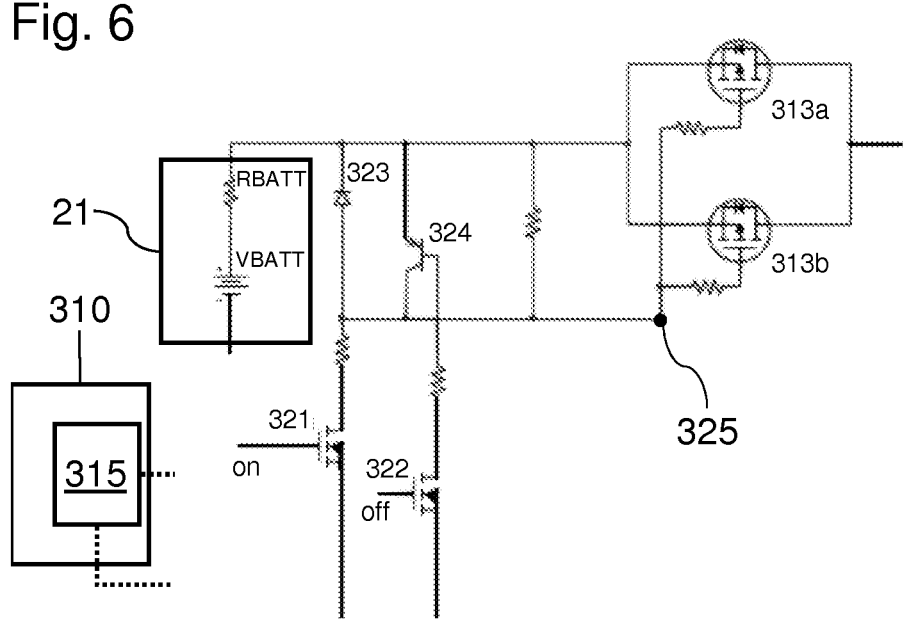
FIG. 6 is an example of an electrical diagram of a part of an interconnection interface.

In the example illustrated in FIG. 6, the control circuit 310 includes a microcontroller 315. FIG. 6 is an example of electrical diagram showing the driving of a rheostat by this microcontroller 315. The rheostat 312 here comprises two doubled-up MOS transistors 313a and 313b. The interconnection interface here exhibits a protection diode 323, a bipolar transistor 324, a first drive transistor 321 and a second drive transistor 322. The microcontroller 315 keeps the transistor 321 closed as long as the current passing through the module 2 does not attain the protection threshold. The transistors 313a and 313b are then closed with a minimum drain/source resistance. When the microcontroller desires to use the isolator function of the transistors 313a and 313b, it closes the transistor 322, so that the transistors 313a and 313b open. By applying an appropriate voltage level on the gate of the transistors by way of a tag 325, the microcontroller 315 uses the transistors 313a and 313b in the linear regime.

It is also possible to envisage a backup analogue regulating loop without calling upon the microcontroller 315, so as to rapidly alleviate a failure of this microcontroller 315.

In the embodiment detailed hitherto, the rheostats 312 are included in the interconnection interface 3. It is possible however to envisage that the modules 2 include a rheostat connected in series with their electrical energy storage element, these rheostats 312 then being driven by the control circuit 310 by way of the terminals 25 and 305.

Figure 7:
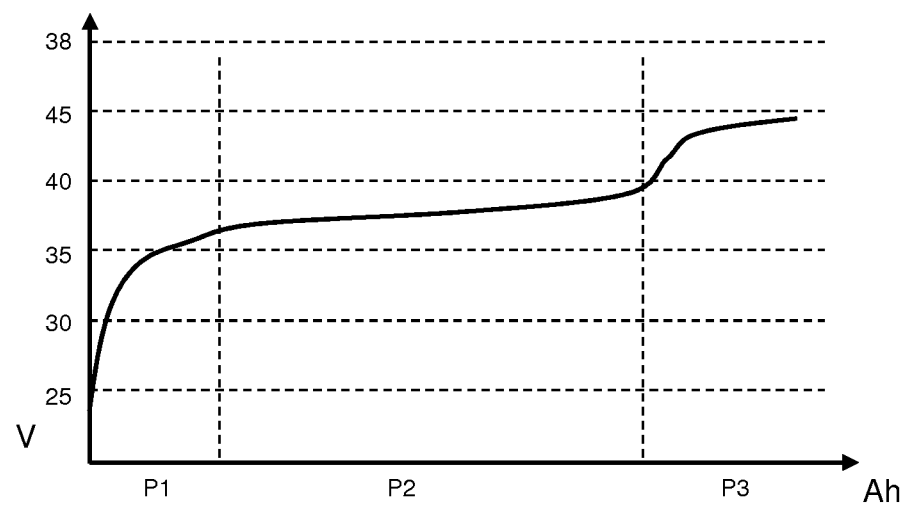
FIG. 7 is a chart illustrating the charging of a battery carried out on the basis of accumulators of $LiFePO_4$ lithium ion type.

FIG. 7 illustrates a charge chart for a module 2 including cells of $LiFePO_4$ type connected in series (here 12 in number). The charge of the module 2 comprises a first span P1 lying between 24 and 37.8 V for a low state of charge, of for example between 0 and 10% of its state of charge. The charge of the module comprises a second span P2 lying between 37.8 and 39.6 V having substantially a plateau shape and corresponding to a medium state of charge of the module 2, of for example between 10 and 95% of the state of charge. The charge of the module 2 comprises a third span P3 lying between 39.6 V and 44.4 V for a high state of charge, of for example between 95 and 100% of the state of charge. The invention turns out to be particularly appropriate with modules including such electrochemical cells. Indeed, for a medium state of charge (for a very large span of state of charge), two modules having very different states of charge have potential differences across their terminals that differ relatively little. Consequently, the power consumed in the rheostat of the most charged module 2 during a power inrush remains relatively restricted with electrochemical cells of this type.

Figure 8:
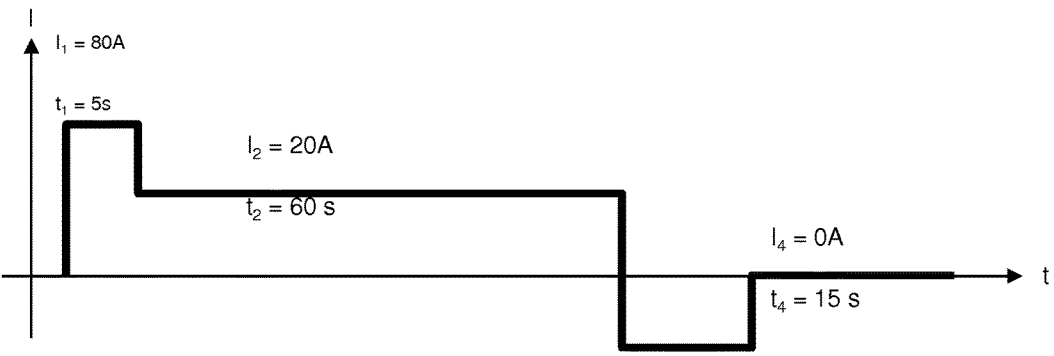
FIG. 8 is an example of a usage cycle of a power supply system supplying an electric vehicle motor.

FIG. 8 illustrates an exemplary reference usage cycle for a power supply system for a motor of a motorized two-wheeler. This cycle includes a discharge spike, a constant mean discharge, a regenerative recharging, and an absence of power supply.

In the examples which follow, simulation results will be presented based on this cycle, using two modules 2 (including electrochemical accumulators of LiFePO$_4$ type) connected in parallel by the interconnection interface 3, a first module having a state of charge of 20%, the other module being fully charged. The rheostats 312 used are here of the type described in FIG. 4.

Figure 9:
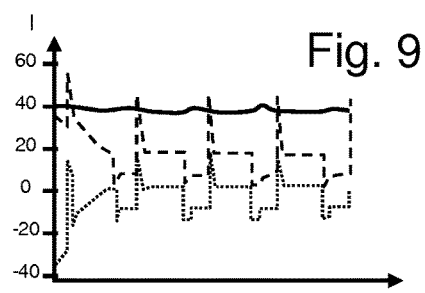
FIG. 9 illustrates the respective intensities of current passing through two transistors in an example of one implementation of the invention.
Figure 11:
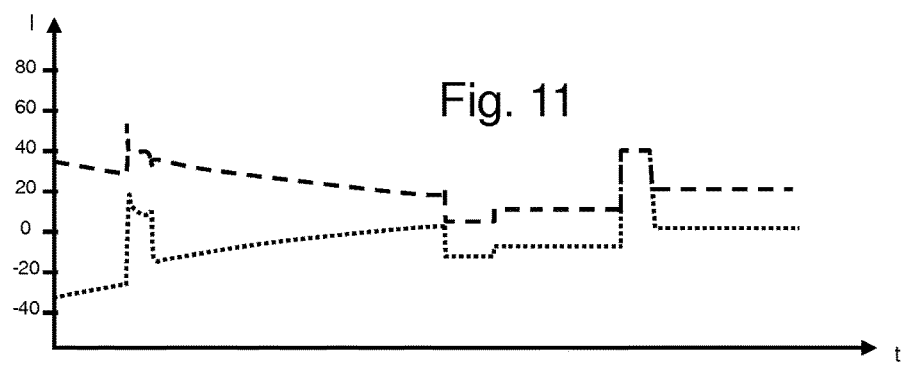
FIG. 11 details the respective intensities of current passing through the two transistors under the same conditions as in FIG. 9, for two first operating cycles.

FIG. 9 illustrates the respective intensities of current passing through the two transistors over the first four cycles. The dashed curve corresponds to the intensity through the rheostat of the most charged module, the dotted curve corresponding to the intensity through the rheostat of the least charged module. These intensities are illustrated in a more detailed manner over the first two cycles in FIG. 11. A negative intensity corresponds to a recharging of the corresponding module. The solid curve corresponds to the potential difference between the terminals 301 and 302. It is noted that the contribution of the most charged module is greater than that of the least charged module during the power spike. However, the discharge intensity of the most charged module remains limited to a value below a discharge protection threshold of 60 A during this spike. The least charged module also contributes to a lesser extent to the discharge current during the mean discharge. Moreover, the most charged module recharges the least charged module during the absence of power supply. Likewise, the least charged module is recharged by priority during the regenerative recharging. In FIG. 12 has been illustrated the evolution of the states of charge of these modules by repeating the test cycles. The states of charge converge within the duration, the state of charge of the least charged module remaining furthermore sufficient to avoid damage thereto.

By repeating the cycles until charge balancing, a wastage through the Joule effect of 3.8 Wh has been noted in the rheostat of the least charged module, and a wastage of 1 Wh has been noted in the rheostat of the most charged module for a total energy provided of 466 Wh. Thus, even with a very considerable discrepancy in state of charge, the power wastage through the rheostats is limited to about 1% of the energy provided. The major part of the wastage occurs during the power spikes, which have a relatively limited duty ratio.

Figure 10:
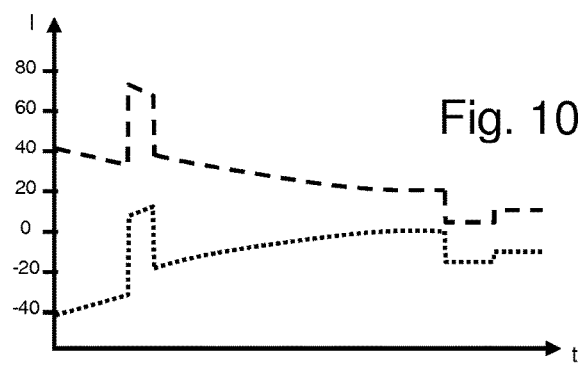
FIG. 10 illustrates the respective intensities of current drawn by two modules connected in parallel with a prior art circuit.

By comparison, FIG. 10 illustrates the intensities of current passing through the two modules during the first test cycle, when they are connected in parallel with a circuit according to the prior art. It is noted that the most charged module undergoes a discharge exceeding its permissible discharge intensity during the power spike. Moreover, it is noted that the least charged module undergoes a recharging exceeding its permissible recharging intensity during the absence of power supply to the load.

FIG. 13 is a schematic sectional view of an example of cooling system 330 for rheostats of an interconnection interface 3. The cooling system 330 illustrated is simplified for readability reasons and undertakes the cooling of only two rheostats. The rheostats are in this instance of the type illustrated in FIG. 4, two transistors being connected in parallel in each rheostat. The cooling system 330 comprises thermal energy absorption pads 332. A first pad 332 is disposed under the transistors 313c and 313d. A second pad 332 is disposed under the transistors 313e and 313f. A thermal grease 331 is typically interposed between the pads 332 and the transistors 313c, 313d, 313e, 313f. The pads 332 are fixed on a thermal dissipater 334. Electrical insulating and thermal conducting layers 333 are interposed in contact between the pads 332 and the dissipater 334. The insulating layers 333 can be products distributed under the commercial reference SilPad.

The pads 332 are dimensioned to rapidly absorb the thermal energy generated by a rheostat during a power spike. The pads 332 are thus aimed at avoiding a sudden temperature rise in the rheostats and are aimed at conducting the thermal energy of the rheostats to the dissipater 334. The pads can for example be formed of a metal bulk block.

The dissipater 334 is configured to dissipate the thermal power generated by the transistors 313c, 313d, 313e, 313f, and transmitted by the pads 332. The dissipater 334 is dimensioned to dissipate the mean thermal power generated by the transistors 313c, 313d, 313e, 313f. The dissipater 334 is thus aimed at maintaining the mean temperature of the transistors below a certain level.

For transistors 313c, 313d, 313e, 313f in which the thermal dissipation is performed at the level of the drain, the layers 333 make it possible to isolate the drains of the transistors from the two rheostats, the latter being liable to exhibit a different electrical potential. In order to favour the thermal transfer between the transistors and the pads 332, the thermal grease 331 may be of the electrically conducting type, the pads 332 then being at the potential of the drains of the transistors with which they are associated.

FIG. 14 illustrates the junction temperature and the power of the transistor most worked during the first two operating cycles. The simulations have been performed with an ambient temperature of 45°.

FIG. 15 illustrates on the one hand the junction temperature of this transistor (dashed line), on the other hand the temperature of its pad 332 (dotted) and moreover the temperature of the dissipater 334 (solid line). It is noted that with a repetition of cycles, the junction temperature remains below a threshold of 125°, the simulated transistor having a maximum permissible junction temperature of 175°.

For safety, it is possible to estimate through the control circuit 310 the junction temperature of the transistors 313c, 313d, 313e, 313f by measuring the current passing through them, the voltage across their terminals and the ambient temperature.

Figure 16:
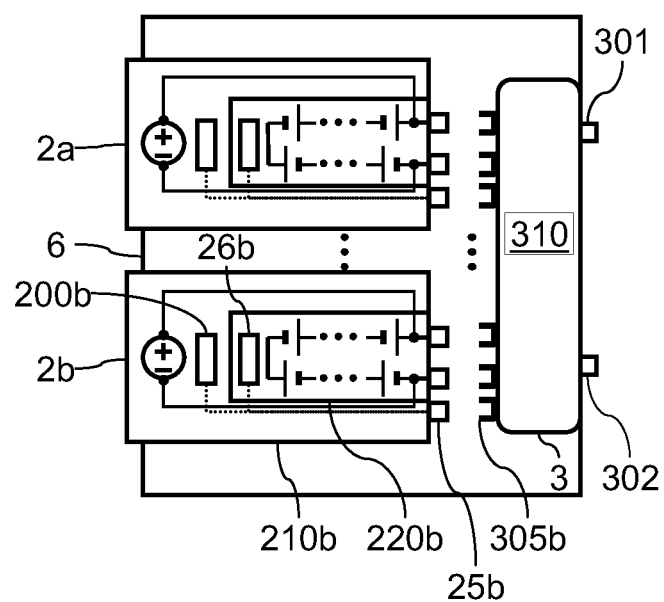
FIG. 16 is a schematic representation of an electrical supply device according to the invention.

Moreover, the invention pertains to an electrical supply device comprising a distributing of functions between its various structural elements. FIG. 16 is a schematic representation of such an electrical supply device. The electrical supply device illustrated here exhibits an interconnection interface 3, a casing 6 to which the interconnection interface 3 is fixed, and modules 2a and 2b.

The modules 2a and 2b include on the one hand a casing and on the other hand an electrical energy storage element. The module 2b includes in particular a casing 210b and an electrical energy storage element 220b. The casing 210b includes the connection facility (terminals 23, 24 and 25) and a supervision circuit for module 200b. The storage element 220b is housed in a removable manner in the casing 210b and includes electrochemical cells and a device for managing the cells 26b. The casing 210b can exhibit a standard shape factor with a view to receiving various types of storage elements. The casing 210b can in particular serve as adaptor between a storage element and the interconnection interface 3.

Among the functions envisaged may in particular be cited the following functions:
- measurement of the voltages of the electrochemical cells and of the temperatures;
- measurement of the current passing through the module;
- making safe of the module in case of:
- charge/discharge current too high;
- voltage of an electrochemical cell too high/too low;
- temperature too high/too low;
- management of the end of charging of a module;
- calculation of the energy remaining in the module;
- calculation of the power that can be provided/absorbed by the module;
- recording of the usage data (from transport, through storage, to usage) of the module for warranty;
- communication with the powered electric load (energy remaining, power available, alarms/defects etc.);
- regulation of the discharge current of each module;
- management of the modules so as to ensure continuity of service of the electric load, and to reduce losses.

It is possible to envisage executing the following functions in the modules 2:
- measurement of the voltages of the electrochemical cells and of the temperatures;
- measurement of the current passing through the module;
- making safe of the cells in case of:
- charge/discharge current too high;
- voltage of an electrochemical cell too high/too low;
- temperature too high/too low;
- management of the end of charging of a module;
- calculation of the energy remaining in the module;
- calculation of the power that can be provided/absorbed by the module;
- recording of the module's usage data for warranty.

It is possible to envisage executing the following functions in the interconnection interface 3:
- communication with the powered electric load (energy remaining, power available, alarms/defects etc.);
- regulation of the discharge current of each module;
- management of the modules so as to ensure continuity of service of the electric load, and to reduce losses.

The module 2 and the interconnection interface 3 can be connected by a communication bus (type RS232, LIN, CAN or SPI, I2C etc., as a function of the position of the probes 311). This type of distribution makes it possible to have no or little thermal management at the level of the module 2. Indeed, the powers dissipated during the balancing of the electrochemical cells or else upon the passage of the power through the power components of the management device 26 are of the order of a Watt, while the power dissipated in the regulation of the output current of each module 2 may attain several tens of Watts.

It is possible to envisage executing the following functions in the management device 26b, the said functions forming a subset for monitoring the cells and keeping them safe:
- measurement of the voltages of the electrochemical cells and of the temperatures;
- making safe of the cells in case of:
- charge/discharge current too high;
- voltage of an electrochemical cell too high/too low;
- temperature too high/too low;
- balancing of the cell voltages.

It is possible to envisage executing the following functions in the supervision device 200b, the said functions forming a subset for tracking usage, for calculating performance and communication:
- measurement of the current passing through the module;
- calculation of the energy remaining in the module;
- calculation of the power that can be provided/absorbed by the module;
- recording of the module's usage data for warranty.

This distributing of the functions allows the use of a circuit for keeping the cells safe which is associated with the latter and operates in an independent manner in relation to the remainder of the supply device. It is thus easier to adapt an existing storage element to render it compatible with the interconnection interface 3 by using a supervision device 200b integrated into an adaptation casing 210b.

The invention claimed is:

1. An apparatus comprising an electrical power supply system having alterable capacity, said electrical power supply system comprising electrical energy storage modules, and an interconnection interface, wherein each of said electrical energy storage modules comprises two connection terminals of opposite polarities and an electrical energy storage element connected between said two terminals, wherein said interconnection interface comprises two pairs of input terminals and two output terminals for a power supply of an electrical load, wherein each pair of input terminals is connected in a removable manner to connection terminals of a respective electrical energy storage module, wherein said interconnection interface forms branches connected in parallel between said two output terminals, each branch including one of said electrical energy storage elements, wherein each of said branches comprises a rheostat connected in series with a corresponding electrical energy storage element of said branch, wherein said interconnection interface further comprises a device for measuring current passing through each of said branches, and a control circuit configured for controlling resistances of said rheostats of said branches as a function of said measured current so as to maintain a current intensity passing through said rheostats to be below a protection threshold.

2. The apparatus of claim 1, wherein said electrical energy storage elements comprise electrochemical accumulators.

3. The apparatus of claim 2, wherein said electrochemical accumulators are of LiFePO4 type.

4. The apparatus of claim 1, wherein each of said rheostats is included in said interconnection interface and is connected between a respective input terminal and an output terminal.

5. The apparatus of claim 1, wherein each of said rheostats comprises a MOS transistor whose resistance is defined by application of a gate/source voltage by said control circuit.

6. The apparatus of claim 5, wherein each of said rheostats comprises two MOS transistors connected head-to-tail in series, and wherein a resistance of each of said two transistors is defined by said application of said gate/source voltage by said control circuit.

7. The apparatus of claim 1, further comprising a thermal dissipater, and two thermal absorption elements coupled thermally to said thermal dissipater, wherein each thermal absorption element is thermally coupled to a corresponding rheostat.

8. The apparatus of claim 7, wherein said thermal absorption elements are thermally coupled to said thermal dissipater by way of a thermally conducting and electrically insulating layer.

9. The apparatus of claim 1, wherein said control circuit is configured to maintain said current intensity passing through a rheostat to be below a first protection threshold when said rheostat is traversed by a discharge current of said associated electrical energy storage module, and wherein said control circuit is configured to maintain a current intensity passing through said rheostat to be below a second protection threshold when said rheostat is traversed by a charge current, said first and second protection thresholds being different.

10. The apparatus of claim 1, wherein said control circuit is configured to allow discharge of an electrical energy storage module having a higher state of charge towards an electrical energy storage module having a lower state of charge in the absence of an electric load connected to said output terminals of said interconnection interface.

11. The apparatus of claim 1, wherein each of said branches comprises a fuse connected in series with one of said electrical energy storage elements and a rheostat, a cut-out threshold of said fuse being greater than said protection threshold.

12. The apparatus of claim 1, further comprising a protection casing in which said input terminals of said interconnection interface are housed, wherein said protection casing is configured to guide said electrical energy storage modules by sliding so that connection terminals of an electrical energy storage module at an extremity of sliding travel thereof connect to a respective pair of input terminals of said interconnection interface.

13. The apparatus of claim 1, wherein said electrical energy storage modules comprise a casing in which said electrical energy storage element is housed in a removable manner, wherein said electrical energy storage element comprises electrochemical cells, and a management device for said electrochemical cells, wherein said casing comprises a supervision device, and a connection facility electrically connecting said electrical energy storage element to said two connection terminals of opposite polarities of said electrical energy storage module, wherein said management device is programmed to implement a function selected from the group consisting of measurement of voltage of said electrochemical cells, measurement of temperature of said electrochemical cells, making said cells safe in case of excessive charge or discharge current, making said cells safe in case of too high or too low voltage of an electrochemical cell, and balancing voltages of said electrochemical cells, wherein said supervision device is programmed to implement a functionality selected from the group consisting of measurement of current passing through said storage element, calculation of said remaining energy in said storage element, calculation of charge/discharge power of said storage element, and recording of said electrical energy storage module's usage data.

\* \* \* \* \*